United States Patent
Shieh

(10) Patent No.: US 7,000,172 B2
(45) Date of Patent: Feb. 14, 2006

(54) DECODING SYSTEM AND METHOD IN AN OPTICAL DISK STORAGE DEVICE

(75) Inventor: Jia-Horng Shieh, Junghe (TW)

(73) Assignee: MediaTek Inc., Hsin-Chu (TW)

(*) Notice: Subject to any disclaimer, the term of this patent is extended or adjusted under 35 U.S.C. 154(b) by 271 days.

(21) Appl. No.: 09/828,202

(22) Filed: Apr. 9, 2001

(65) Prior Publication Data

US 2002/0133779 A1    Sep. 19, 2002

(30) Foreign Application Priority Data

Feb. 2, 2001    (TW) .............................. 90102241 A

(51) Int. Cl.
H03M 13/00    (2006.01)
H03M 13/03    (2006.01)

(52) U.S. Cl. .................. 714/785; 714/784; 714/793
(58) Field of Classification Search ............... 714/755, 714/752, 75, 784, 785, 786, 793
See application file for complete search history.

(56) References Cited

U.S. PATENT DOCUMENTS

| | | | | |
|---|---|---|---|---|
| 6,009,549 A | * | 12/1999 | Bliss et al. | 714/769 |
| 6,052,815 A | * | 4/2000 | Zook | 714/758 |
| 6,158,039 A | * | 12/2000 | Cho et al. | 714/769 |
| 6,167,548 A | * | 12/2000 | Yamakura | 714/763 |
| 6,317,855 B1 | * | 11/2001 | Horibe | 714/752 |
| 6,470,473 B1 | * | 10/2002 | Iwasa | 714/785 |
| 6,543,026 B1 | * | 4/2003 | Dadurian | 714/785 |

* cited by examiner

Primary Examiner—David Ton
Assistant Examiner—Esaw T. Abraham
(74) Attorney, Agent, or Firm—Andrew D. Fortney

(57) ABSTRACT

The present invention provides a decoding system and method for an optical disk storage device to receive and decode the data of the disk. The present invention does not need to increase the clock frequency and the bus width of the decoding system, it can effectively decrease the access times to the data buffer and the system response time by changing the structure of the conventional decoding system, in this way the present invention increases the parallel processing capability and the decoding speed of the system, thus, it can enhance the entire device to become a high speed optical storage device.

33 Claims, 8 Drawing Sheets

DECODING SYSTEM AND METHOD IN AN OPTICAL DISK STORAGE DEVICE

REFERENCE TO RELATED APPLICATION

This application claims the benefit of priority under 35 U.S.C. §119(a) of Taiwan Patent Application 090102241, titled "Decoding System and Method in an Optical Disk Storage Device," filed on, Feb. 2, 2001.

BACKGROUND OF THE INVENTION

1. Field of the Invention

This invention relates in general to a decoding system and method, and more particularly to a decoding system and method in an optical disk storage device with high decoding speed by decreasing the access times to a data buffer.

2. Description of the Related Art

Referring now to FIG. 1, it is a block diagram of a conventional decoding system in a DVD storage device. As shown in FIG. 1, a demodulator 102 reads the data stored in the disk 100 for converting 16 bit code words into 8 bit data symbols. Then, the demodulator 102 generates an ECC (Error Correction Code) block 107 and transmits the ECC block 107 to a data buffer 106 through a bus 104. The ECC block 107 comprises main data 108, a PO(parity of outer-code) 110 and a PI(parity of inner-code) 112. The scale of the main data 108 is 192*172 bytes, the scale of the PO 110 is 16*172 bytes, and the scale of the PI 112 is 208*10 bytes. Main data 108 appended with the PO 110 forms an outer-code of RS(Reed Solomon), and main data 108 appended with the PO 110 and the PI 112 forms an inner-code of RS. ECC decoder 114 reads the ECC block 107 from the data buffer 106 to perform the error correction decoding along the PI direction (i.e. X direction) and PO direction (i.e. Y direction) of the ECC block 107 in turn. Then, the ECC decoder 114 writes the corrected part of the ECC block 107 into the data buffer 106. The de-scrambler and EDC(Error Detection Code)check 116 reads the corrected main data 108 stored in the data buffer 106 for de-scrambling the main data 108 and checking whether errors in the main data 108 are corrected. When the host needs the main data 108, an ATAPI(Advanced Technology Attachment Packet Interface) 118 reads the main data 108 in the data buffer 106, then de-scrambles and transmits the main data 108 to the host.

Referring to FIG. 2, it illustrates a flow chart of the conventional decoding system accessing to the data buffer in a DVD storage device. At a step 201, after performing demodulation, a demodulator 102 writes an ECC block 107 into a data buffer 106. Next, at a step 202, an ECC decoder 114 reads the ECC block 107 of the PI direction to perform the error correction decoding, then writes the corrected part of the ECC block 107 into the data buffer 106. Continuing the step 202, it flows to a step 203, the ECC decoder 114 reads the ECC block 107 of the PO direction to perform the error correction decoding, then writes the corrected part of the ECC block 107 into the data buffer 106. After finishing the step 203, the system can repeat the steps 202 and 203 to enhance the error correction capability according to the setting of the system. Then at a step 204, the de-scrambler and EDC check 116 reads the corrected main data 108 stored in the data buffer 106 for de-scrambling the main data 108 and checking whether errors in the main data 108 are corrected. When the host needs the main data 108, at a step 205, an ATAPI 118 reads the main data 108 stored in the data buffer 106, then de-scrambles and transmits the main data 108 to the host. In the preceding prior art, each module of the decoding system needs to run the above-mentioned steps in turn to finish the decoding process in a DVD storage device.

Referring now to FIG. 3, it illustrates a flow chart of decoding RS code in a conventional ECC decoder. At a stage 301, original code words in the data buffer 106 enter the stage of syndrome generation, wherein the ECC decoder 114 calculates the PI syndrome or the PO syndrome. Next, at a stage 302, the ECC decoder 114 calculates the "erasure location polynomial" according to the known erasure location, then calculates the "Forney's modified syndrome polynomial" and gets the initial value of the next stage according to the calculated syndromes and erasure location polynomial. Continuing the stage 302, at a stage 303, the ECC decoder 114 calculates the "error-erasure locator polynomial" and "error erasure evaluator polynomial" according to the initial value produced by the previous stage 302. Then, at a stage 304, a Chien search unit finds the error locations and error magnitudes. Finally, at a stage 305, the ECC decoder 114 corrects the errors in the original code words to get the correct code words and writes them into the data buffer 106.

According to FIG. 1, when the conventional decoding system performs the decoding process, each module of the system needs to access to the data buffer. If each module of the decoding system can access to the data buffer synchronously, the system can increase the decoding speed to become a high speed DVD. However, according to FIGS. 2 and 3 the ECC decoder 114 in the conventional decoding system must access to the data buffer when it performs the error correction decoding along the PI and PO directions of the ECC block each time, thereby it takes a lot of time and limits the speed of the entire DVD system for many accesses to the data buffer. Now there are several solutions for the above bottleneck: enhancing the clock frequency of the decoding system, increasing the bus width of the decoding system, and decreasing the access times to the data buffer, etc.

SUMMARY OF THE INVENTION

It is therefore an object of the invention to provide a decoding system and method for an optical disk for decreasing the access times to the data buffer. In this way, it can enhance the parallel processing capability of the decoding system and increase the decoding speed to become a high speed DVD.

In the first embodiment, a demodulator reads the data from a disk to perform the demodulation and transfers the generated ECC block to a syndrome generator. Next, the syndrome generator writes the main data into a data buffer, and calculates the PI syndrome and the PO syndrome simultaneously, then stores the data to a memory during calculating the PO syndrome, and writes the calculation results into the data buffer. Afterward, the ECC decoder reads the PI syndrome and the PO syndrome from the data buffer to perform the error correction decoding, and writes the corrected PI syndrome and PO syndrome and the corrected part of the main data into the data buffer. Then, a de-scrambler and EDC check reads the main data stored in the data buffer to de-scramble the main data and check whether errors are corrected. After finishing the preceding processes, the main data is transferred to the host through ATAPI when the host needs data.

The second embodiment is similar to the first embodiment, the difference is the ECC decoding process; the ECC decoder reads the PI syndrome and the PO syndrome from a data buffer to perform the error correction decoding and writes the PI syndrome and the PO syndrome into a first data room and a second data room respectively, then writes the corrected PI syndrome and PO syndrome into the first data room and the second data room respectively and writes the corrected part of the main data into the data buffer. When repeating the error correction decoding, the ECC decoder only needs to access to the first and the second data room.

The third embodiment is similar to the first embodiment, the difference is that the syndrome generator only calculates the PI syndrome, so there is no need to use a memory to store the data of the PO syndrome.

The fourth embodiment is similar to the third embodiment, but it has one more data room. The ECC decoder reads the main data and the PO from the data buffer to perform the error correction decoding of the PO direction, and writes the PO syndrome into the data room. After the error correction decoding of the PO direction, the ECC decoder updates the PO syndrome in the data room and writes the corrected PI syndrome and the corrected part of the main data into the data buffer. Then, the ECC decoder reads the PI syndrome from the data buffer to perform the error correction decoding of the PI direction, and writes the corrected PI syndrome and the corrected part of the main data into the data buffer. When repeating the error correction decoding, the ECC decoder only needs to access to the data room for the PO syndrome and access to the data buffer for the PI syndrome.

The difference between the fifth embodiment and the fourth embodiment is that the decoding system performs the ECC decoding, de-scrambling and EDC checking at the same time, also the decoding system judges whether the correction process is correct according to the EDC check.

The foregoing is a brief description of some deficiencies in the prior art and advantages of this invention. Other features, advantages and embodiments of the invention will be apparent to those skilled in the art from the following description, accompanying drawings and appended claims.

BRIEF DESCRIPTION OF DRAWINGS

The following detailed description, given by way of examples and not intended to limit the invention to the embodiments described herein, will be best understood in conjunction with the accompanying drawings, in which.

DETAILED DESCRIPTION OF THE INVENTION

Detailed descriptions of the preferred embodiment are provided herein. It is to be understand, however, the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 3:
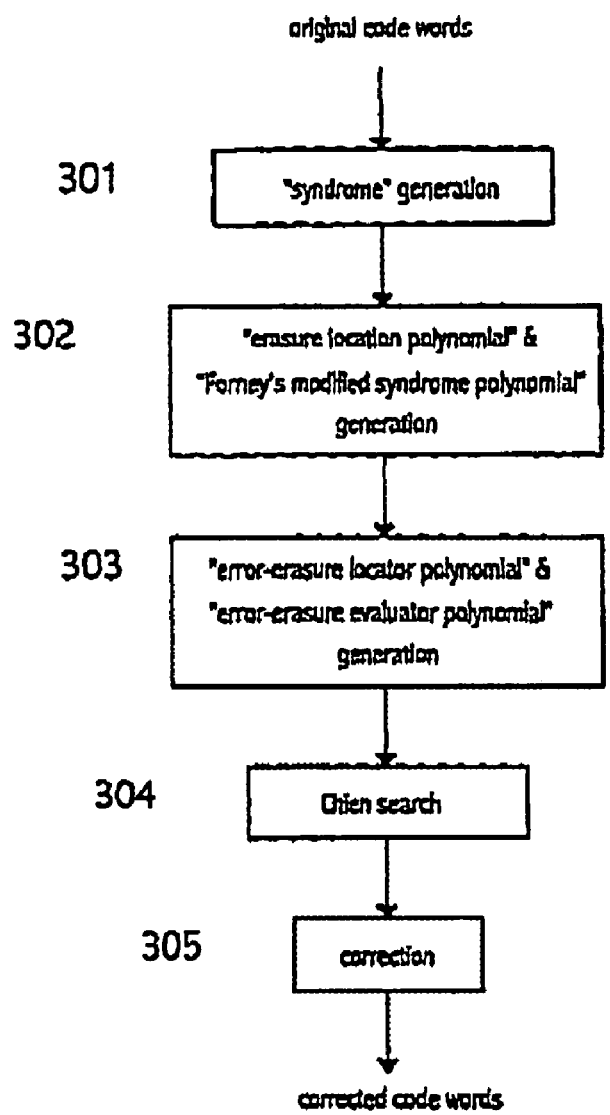
FIG. 3 illustrates a flow chart of decoding RS code in the conventional ECC decoder.

As shown in FIG. 3, no matter the ECC decoder performs the error correction decoding of the PI or PO direction, the first step is to generate syndromes. Assume that before performing the error correction decoding the data in one direction of the ECC block is r(X), and the data after performing the error correction decoding becomes r'(X), then r'(X)=r(X)+e(X), where the e(X) represents the error. Thus, a new syndrome after performing the error correction decoding can be shown as follows:

$$S_{k(r')}(X) = \sum_{i=0}^{n-1} r'_i \alpha^{ik} = \sum_{i=0}^{n-1} (r_i + e_i)\alpha^{ik} = \sum_{i=0}^{n-1} r_i \alpha^{ik} + \sum_{i=0}^{n-1} e_i \alpha^{ik} = S_{k(r)}(X) + S_{k(e)}(X)$$

According to the above equation, when the decoding system performs the error correction decoding, the syndromes before error correction decoding appended with the syndrome of the error produces the new syndrome. Therefore, the ECC decoder calculates the PI syndrome and the PO syndrome before the decoding system performs the error correction decoding. Then, when the decoding system performs the error correction decoding, the ECC decoder calculates the syndrome of the error of the PI direction and adds the original syndrome of the data of the PI direction to generate a new PI syndrome; similarly, the ECC decoder calculates the syndrome of the error of the PO direction and adds the original syndrome of the data of the PO direction to generate a new PO syndrome. That is, the PI syndrome and the PO syndrome all correspond to a corrected ECC block.

Figure 4:
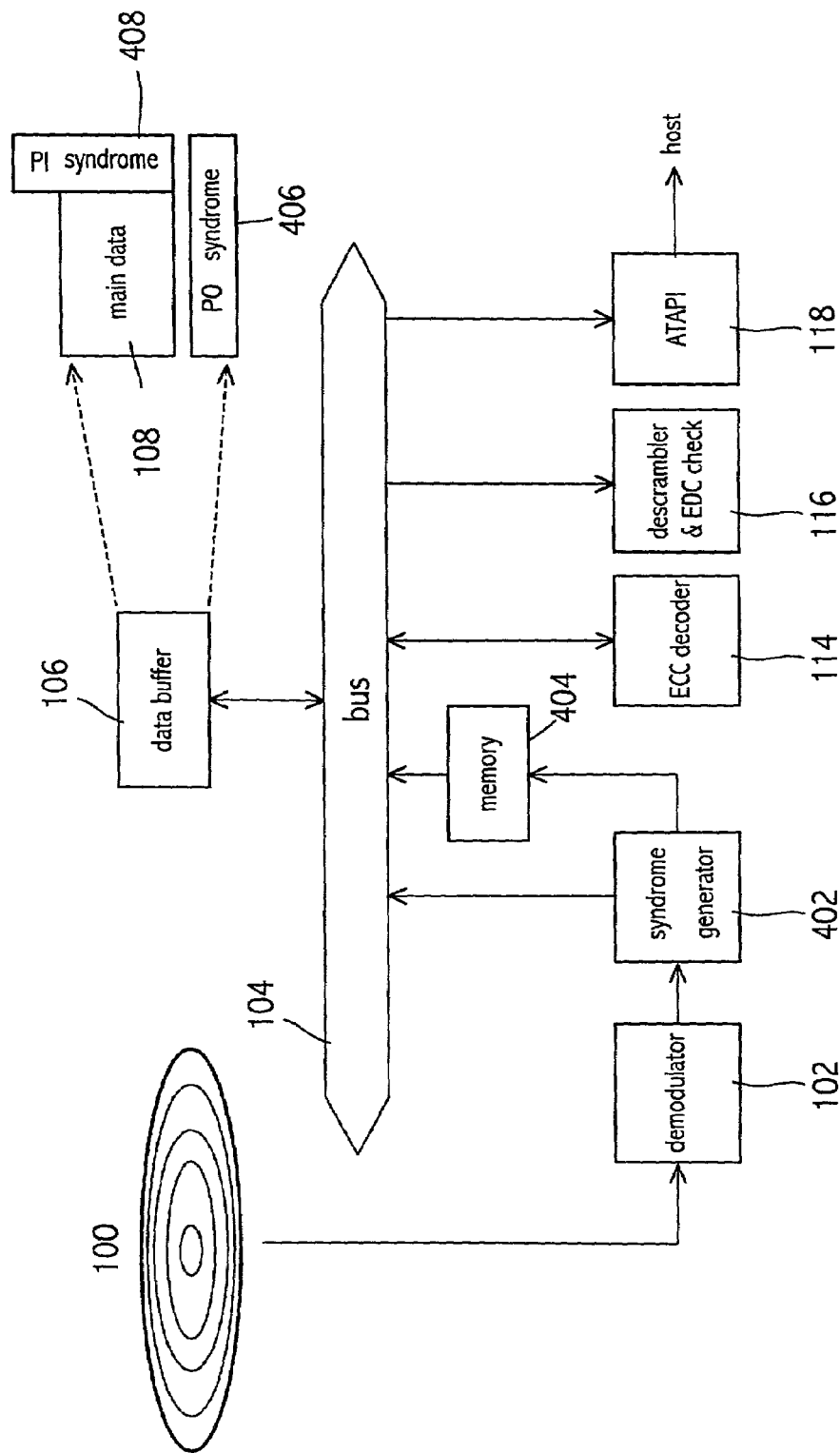
FIG. 4 illustrates a block diagram of a first embodiment of the present invention.

Turning now to FIG. 4, it illustrates a block diagram of a first embodiment of the present invention. The decoding system in FIG. 4 is similar to FIG. 1. The difference is that the data stored in the data buffer 106 are main data 108, PO syndrome 406, and the PI syndrome 408, wherein the scale of the main data 108 is 192*172 bytes, the scale of the PO syndrome 406 is 208*10 bytes, and the scale of the PI syndrome 408 is 16*182 bytes. Besides, the demodulator 102 transfers directly the ECC block to a syndrome generator 402 after finishing the demodulation process. The syndrome generator 402 writes the main data 108 into the data buffer 106 and calculates the PI syndrome 408 and the PO syndrome 406 by using the PI and the PO of the ECC block. After the syndrome generation, the PI and the PO are abandoned. Since the demodulator 102 transfers the ECC block along the PI direction of the ECC block, the syndrome generator 402 generates and stores the PI syndrome 408 directly into the data buffer 106. While the generation of the PO syndrome 406 is completed after the syndrome generator 402 receives the entire ECC block, thus a memory 404 is needed for storing the data during calculating the PO syndrome 406. After finishing the calculation of the PO syndrome 406, the PO syndrome 406 will be stored to the data buffer 106. Besides, since the ECC block is continuously transmitted to the syndrome generator 402, the memory 404 should be divided into two rooms; one is for receiving the calculation results from the syndrome generator 402, another is for storing the PO syndrome 406 to the data buffer 106. The ECC decoder 114 reads the PI syndrome 408 and the PO syndrome 406 in the data buffer 106 rather than the entire ECC block for performing the error correction decoding. At this time the ECC decoder 114 will calculate both the PI syndrome 408 and the PO syndromes 406 simultaneously, then writes the corrected PI syndrome 408, PO syndrome 406 and the corrected part of the main data 108 into the data buffer 106. Since the PI syndrome 408 and the PO syndrome 406 correspond to the latest ECC block and the host needs only the main data 108, the ECC decoder 114 does not need to update the PI and PO but the PI syndrome 408 and the PO syndrome 406 when errors occur in the PI and PO. Therefore, the PI and the PO are abandoned to save time for the decoding system to access to the data buffer 106. After the ECC decoder 114 finishes the error correction decoding of the ECC block, the de-scrambler and EDC check 116 reads the main data 108 stored in the data buffer 106 to descramble the main data 108 and check whether errors are corrected. After finishing the preceding processes, the main data 108 is transferred to the host through the ATAPI 118 when the host needs data.

Figure 1:
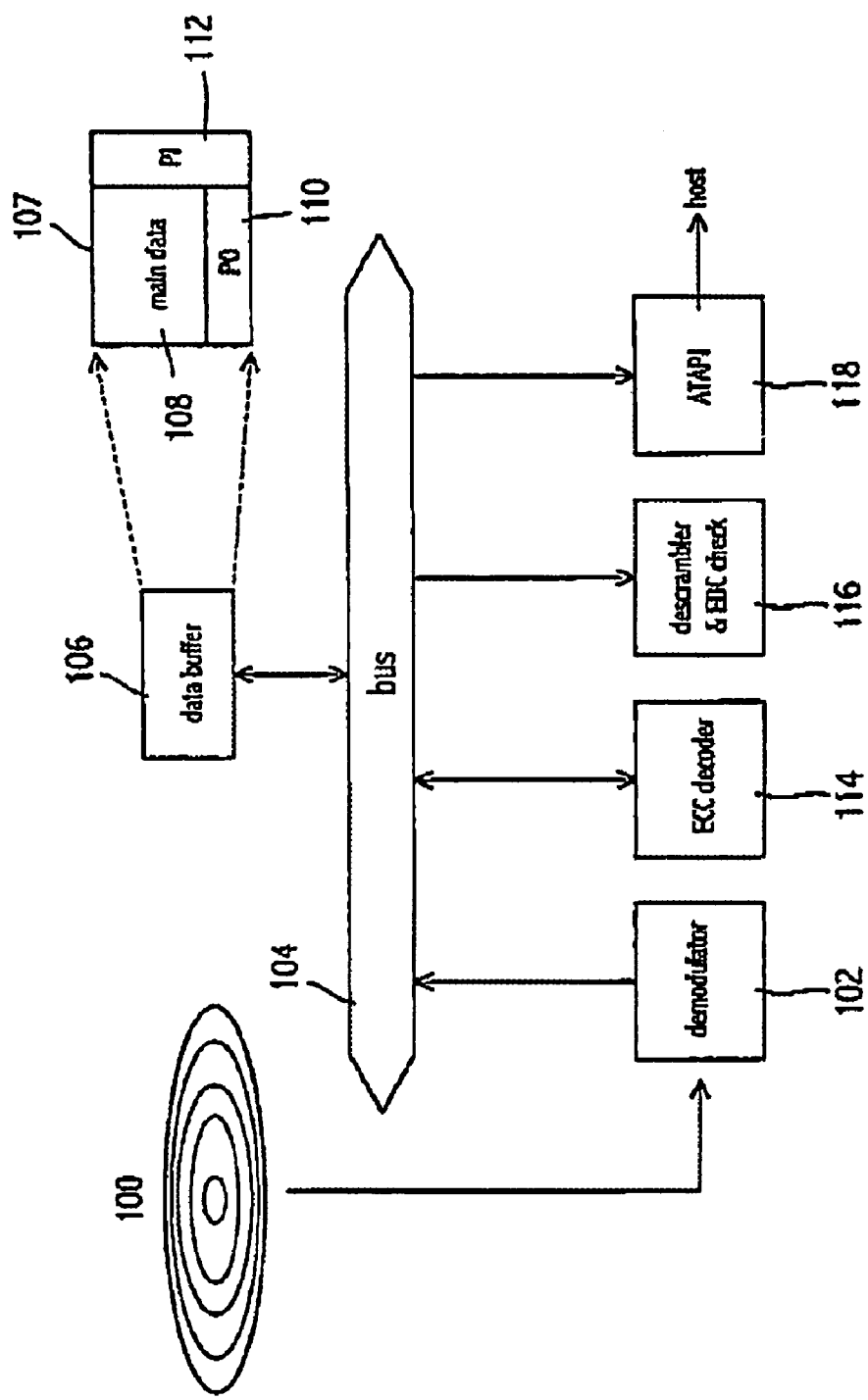
FIG. 1 illustrates a block diagram of a conventional decoding system in a DVD storage device.
Figure 2:
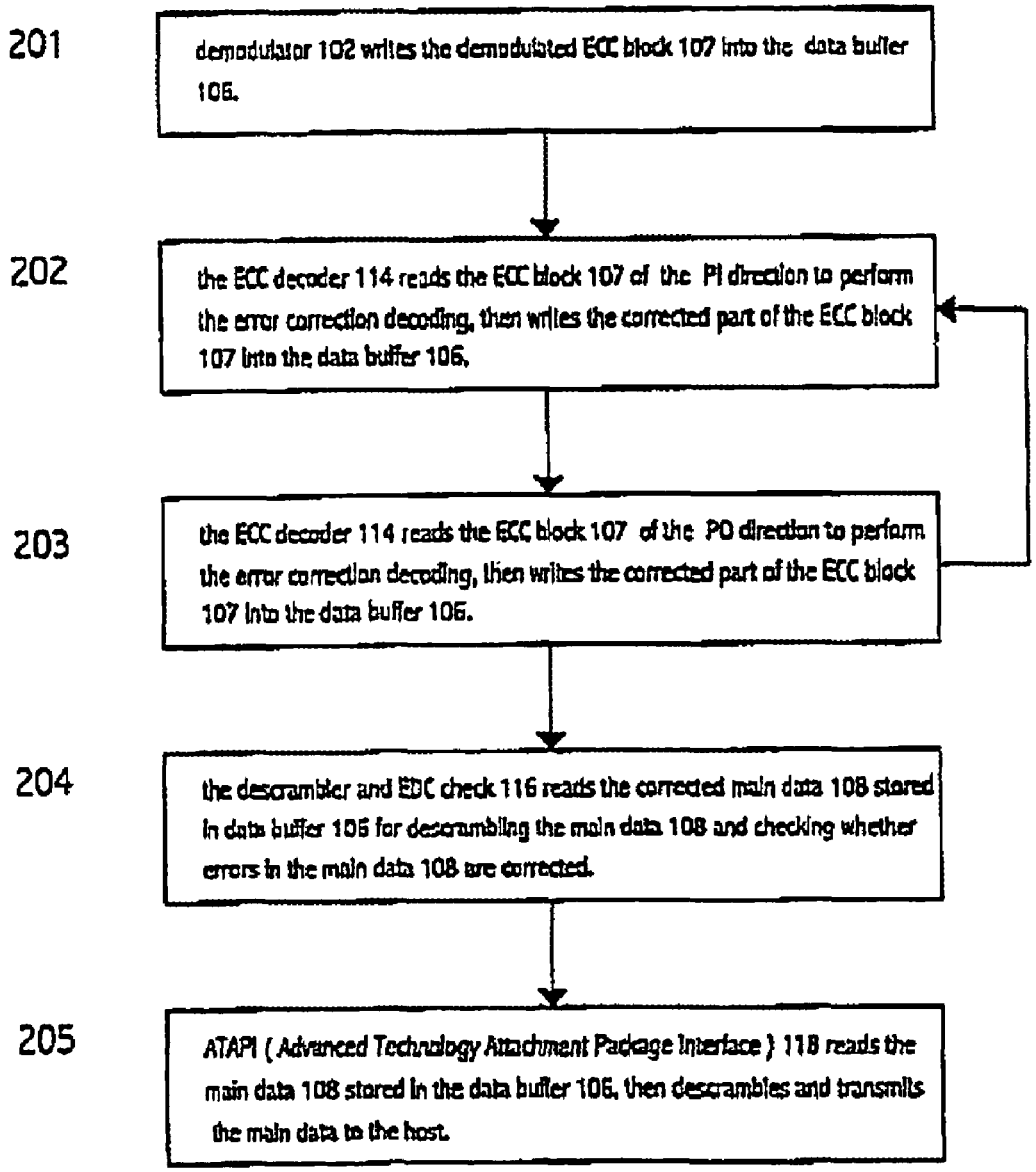
FIG. 2 illustrates a flow chart of the conventional decoding system accessing to the data buffer in a DVD storage device.

Thus, regarding the access to the data buffer 106 in the conventional decoding system of FIG. 1, the demodulator 102 writes the entire ECC block 107 into the data buffer 106, and the ECC decoder 114 needs to read the entire ECC block 107 and writes the corrected part of the ECC block 107 into the data buffer 106 when performing the error correction of the PI and the PO direction. After the error correction decoding is finished, the de-scrambler and EDC check 116 and the ATAPI 118 each needs to read the main data 107 one time. While in the embodiment of FIG. 4 the syndrome generator 402 writes the main data 108, the PI syndrome 408 and the PO syndrome 406 into the data buffer 106, besides, the ECC decoder 114 reads only the PI syndrome 408 and the PO syndrome 406 from the data buffer 106 and writes the corrected PI syndrome 408, PO syndrome 406 and the corrected part of the main data 108 into the data buffer 106. After finishing the error correction decoding, the de-scrambler and EDC check 116 and the ATAPI 118 each needs to read the main data 107 one time. Therefore, the access times to the data buffer 106 of the decoding system in FIG. 4 is smaller in comparison with the conventional decoding system in FIG. 1.

Figure 5:
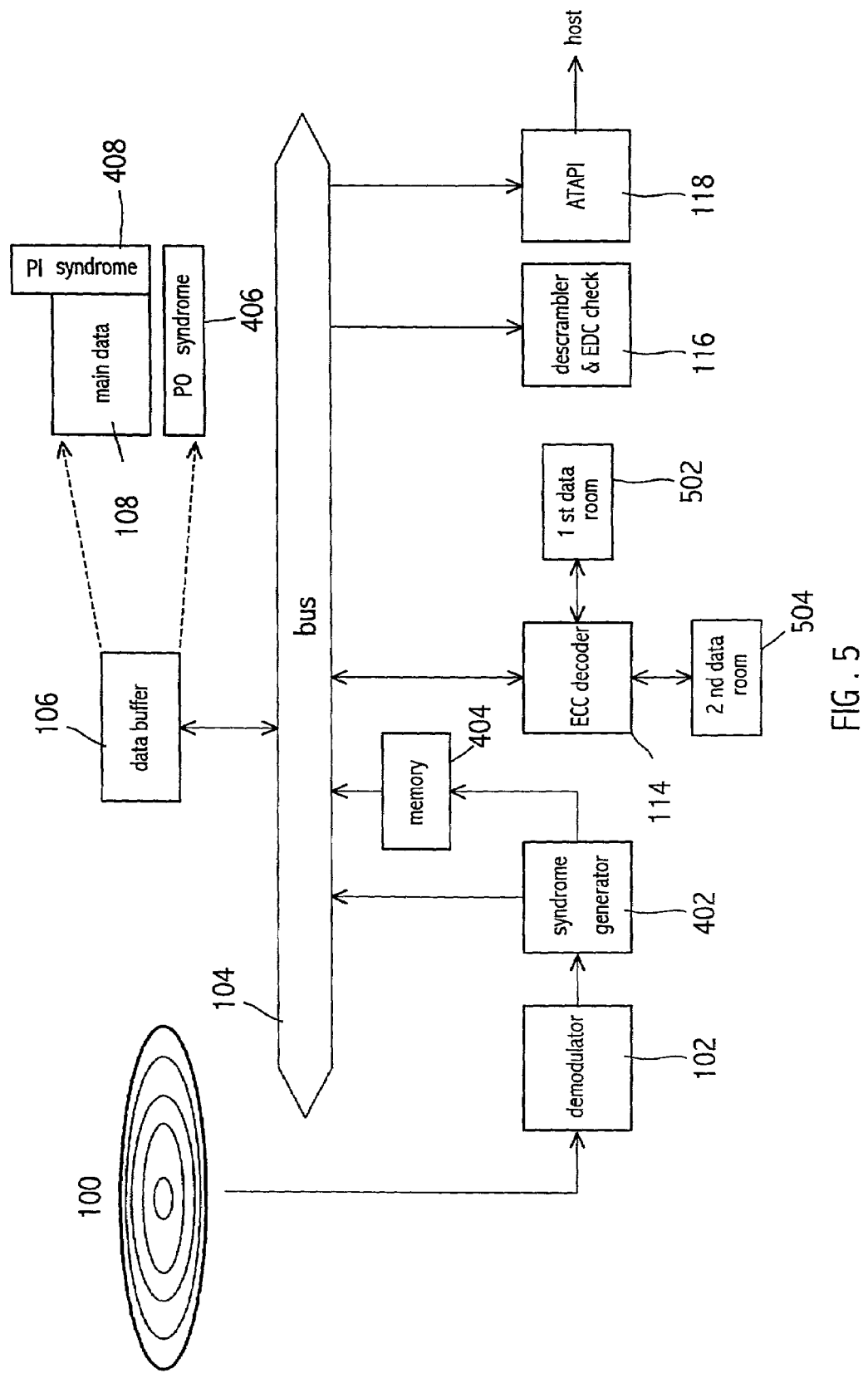
FIG. 5 illustrates a block diagram of a second embodiment of the present invention.

Referring now to FIG. 5, it illustrates a block diagram of a second embodiment of the present invention. The structure of FIG. 5 is similar to FIG. 4, the difference is that the first data room 502 and the second data room 504 are connected to the ECC decoder 114. The ECC decoder 114 reads the PI syndrome 408 and the PO syndrome 406 from the data buffer 106 and writes the PI syndrome 408 and the PO syndrome 406 into the first data room 502 and the second data room 504 respectively to perform the error correction decoding, then writes the corrected PI syndrome 408, PO syndrome 406 into the first data room 502 and the second data room 504 respectively and writes the corrected part of the main data 108 into the data buffer 106. Afterward, the ECC decoder 114 only accesses to the first data room 502 and the second data room 504 to perform the ensuing error correction decoding. Therefore, the structure of FIG. 5 can reduce more access times to the data buffer 106 in comparison with FIG. 4.

Figure 6:
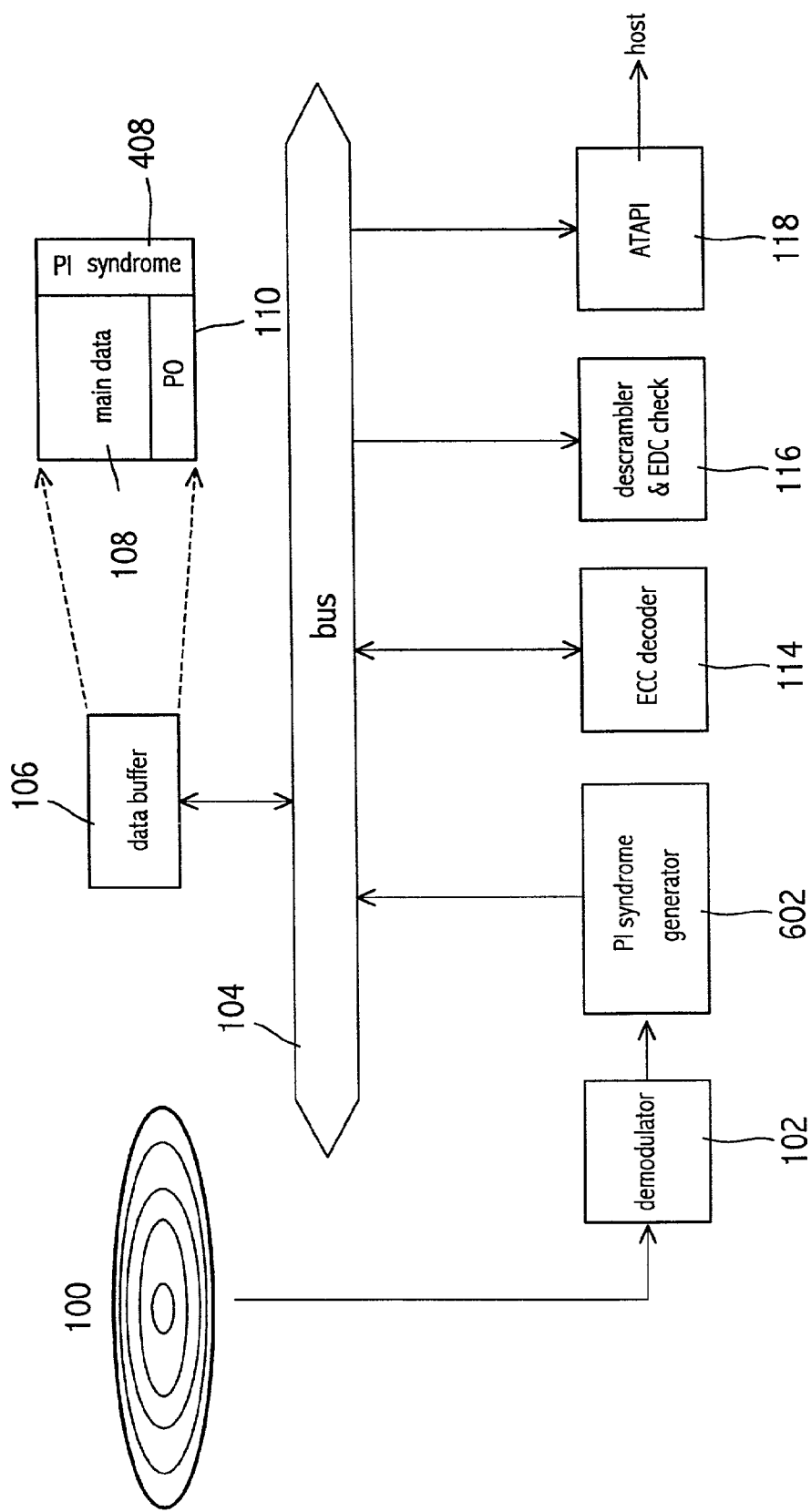
FIG. 6 illustrates a block diagram of a third embodiment of the present invention.

Referring now to FIG. 6, it illustrates a block diagram of a third embodiment of the present invention. The structure of FIG. 6 is similar to FIG. 4, the difference is that the syndrome generator 602 calculates only the PI syndrome 408, so the memory 404 of FIG. 4 is not needed. Besides, since the syndrome generator 602 does not calculate the PO syndrome, the data stored in the data buffer 106 are main data 108, the PO 110 and the PI syndrome 408, wherein the scale of the main data 108 is 192*172 bytes, the scale of the PO 110 is 16*172 bytes, and the scale of the PI syndrome 408 is 208*10 bytes.

Thus, regarding the access times to the data buffer 106 of FIG. 6, the syndrome generator 602 writes the main data 108, PO 110 and the PI syndrome 408 into the data buffer 106. The ECC decoder 114 only needs to read the PI syndrome 408 when performing the error correction decoding of the PI direction, and writes the corrected PI syndrome 408, PO 110 and the corrected part of the main data 108 into the data buffer 106. On the other hand, the ECC decoder 114 reads the main data 108 and the PO 110 when performing the error correction decoding of the PO direction, and writes the corrected PI syndrome 408, PO 110 and the corrected part of the main data 108 into the data buffer 106. After finishing the error correction decoding, the de-scrambler and EDC check 116 and the ATAPI 118 both need to read the main data 108 in the data buffer 106 one time. Therefore, the access times to the data buffer 106 of the decoding system in FIG. 6 is smaller than the conventional decoding system in FIG. 1.

Figure 7:
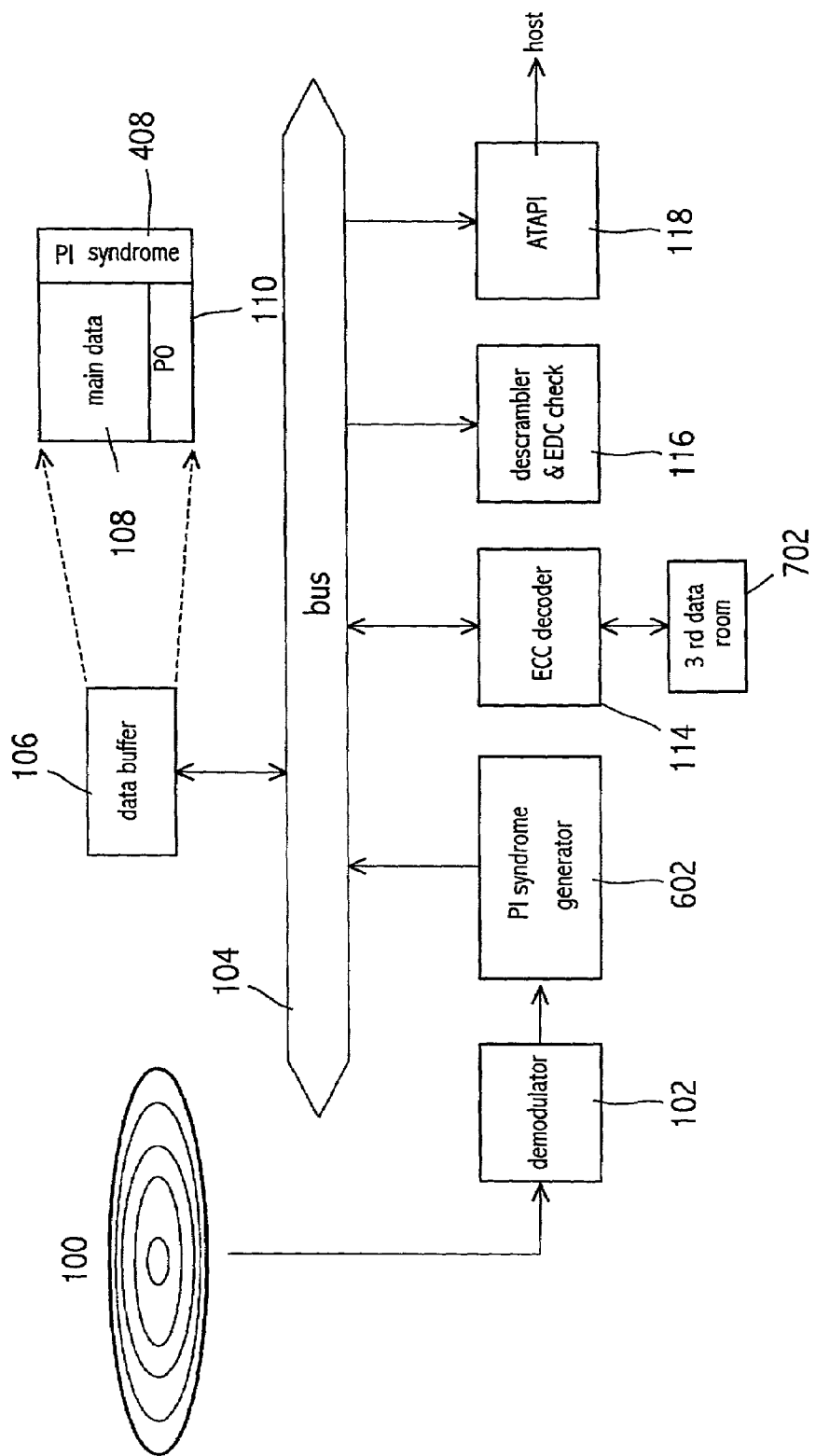
FIG. 7 illustrates a block diagram of a fourth embodiment of the present invention.

Referring now to FIG. 7, it illustrates a block diagram of a fourth embodiment of the present invention. The structure of FIG. 7 is similar to FIG. 6, the difference is that the third data room 702 is connected to the ECC decoder 114. If the ECC decoder 114 first performs the error correction decoding of the PI direction, the ECC decoder 114 only needs to read the PI syndrome 408 from the data buffer 106 and writes the corrected part of the main data 108, the PO 110 and the corrected PI syndrome 408 into the data buffer 106, then, when the ECC decoder 114 performs the error correction of the PO direction, the ECC decoder 114 writes the calculation results of the PO syndrome into the third data room 702 and corrects the main data 108 in the data buffer 106 by using the PO syndrome stored in the third data room 702, in this way it saves many access times to the data buffer 106. If the ECC decoder 114 first performs the error correction decoding of the PO direction, the ECC decoder 114 writes the calculation results of the PO syndrome into the third data room 702 and corrects the main data 108 and the PI syndrome 408 in the data buffer 106 by using the PO syndrome stored in the third data room 702, then when performing the error correction decoding of the PI direction, the ECC decoder 114 also corrects the main data 108 and the PI syndrome 408 in the data buffer 106. Therefore, the structure of FIG. 7 can reduce many access times to the data buffer 106.

Assume that before performing the error correction decoding the data in one direction of the ECC block is r(X), and the data after performing the error correction decoding becomes r'(X), then r'(X)=r(X)+e(X), where the e(X) represents the error. Thus, a new EDC check after performing the error correction decoding can be shown as follows:

$$EDC(x)_{r'}=EDC(x)_r+EDC(x)_e$$

Figure 8:
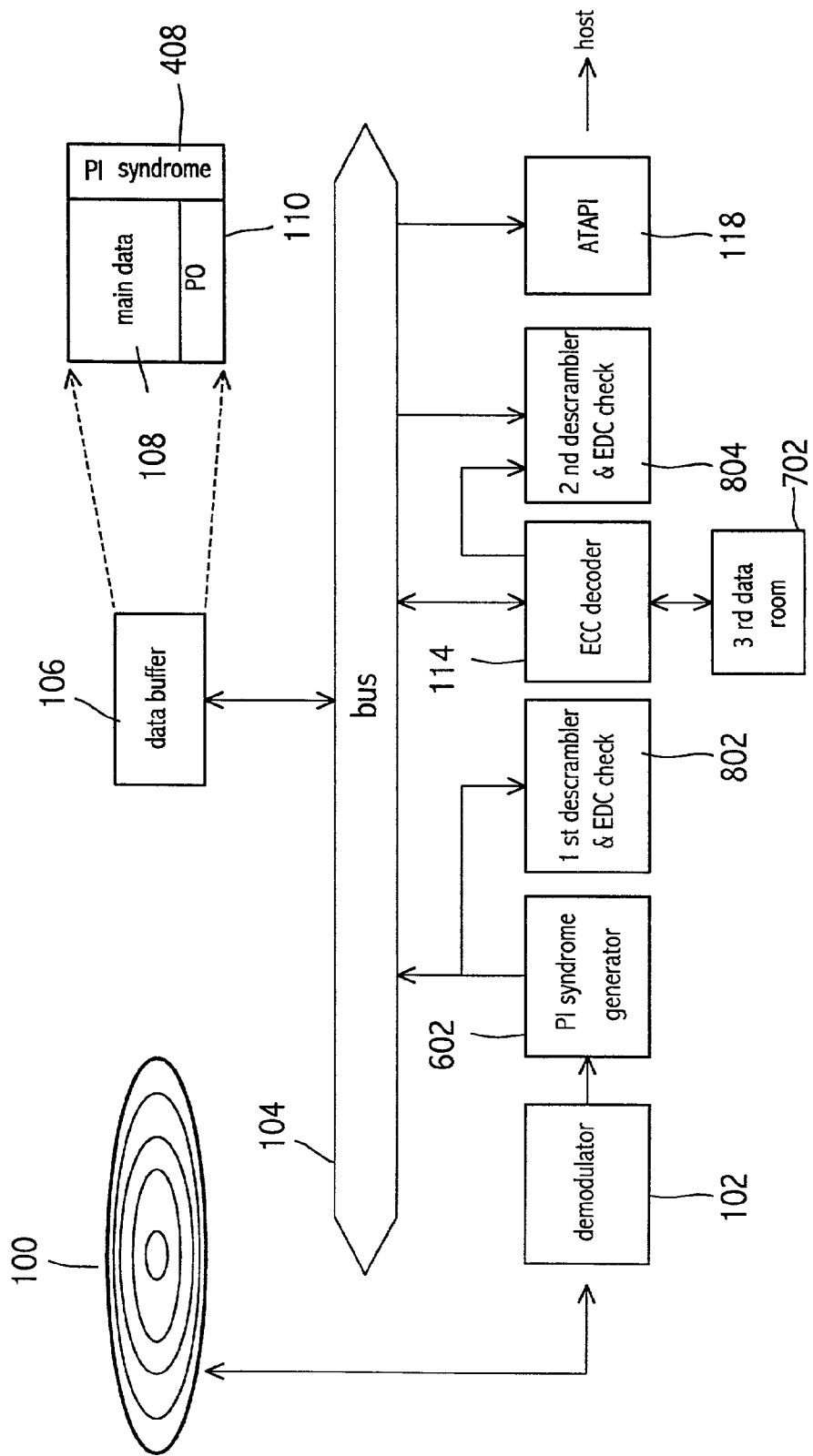
FIG. 8 illustrates a block diagram of a fifth embodiment of the present invention.

According to the above equation, when the decoding system performs the EDC checking, the EDC check before updating appended with the EDC check of the error produces the new EDC check. Since the error correction decoding of the PI direction is the same as the direction of the EDC check, the EDC check of the PI direction before updating appended with the EDC check of the error of the PI direction produces the new EDC check. Thus, the de-scrambler and EDC check 116 can perform the de-scrambling and EDC checking simultaneously when the syndrome generator 602 calculates the PI syndrome 408. Thus, referring now to FIG. 8, it illustrates a block diagram of a fifth embodiment of the present invention. When the syndrome generator 602 writes the main data 108 into the data buffer 106, the main data 108 is also transferred to the first de-scrambler and EDC check 802. When the ECC decoder 114 performs the error correction of the PI direction, the ECC decoder 114 also transfers the error to the second de-scrambler and EDC check 804 to calculate the EDC check of the error, after appending with the EDC check from the first de-scrambler and EDC check 802, the second de-scrambler and EDC check 804 gets the first EDC check of the PI direction. The ensuing error correction decoding of the PI and PO directions can ignore the part of the main data 108, which the EDC checking is finished, so that it can avoid occurring errors during the ensuing decoding process. After finishing the ensuing error correction decoding of the PI and PO directions, the second de-scrambler and EDC check 804 will de-scramble the main data 108 and check again whether errors are corrected.

According to FIG. 4 to FIG. 8, during the decoding process of the present invention the ECC decoder 114 reads the main data 108 from the data buffer 106 only one time for calculating the PI syndrome and the PO syndrome. Afterward, by calculating the syndrome of the error the ECC decoder 114 does not access to the data buffer 106 when updating the PI syndrome and the PO syndrome. Thus, it can largely reduce the access times to the data buffer 106. Besides, the ECC decoder 114 of the present invention can be a RSPC(Reed Solomon Product Code) structure. The data buffer 106, the memory 404, the first data room 502, the second data room 504 and the third data room 702 can be EDO-RAM SRAM DRAM SL-DRAM DR-DRAM EDO-DRAM SDRAM DDR-SDRAM VC-SDRAM, etc.

In comparison with the conventional decoding system, the decoding system of the present invention only increases one memory and performs the error correction decoding immediately after finishing the demodulation. No need to increase the clock frequency and the bus width of the decoding system, it can effectively decrease the access times to the data buffer and the system response time, and increase the parallel process capability and the speed of the decoding, thus, it can become a high speed optical storage device, such as a DVD.

While the invention has been described with reference to various illustrative embodiments, the description is not intended to be construed in a limiting sense. Various modifications of the illustrative embodiments, as well as other embodiments of the invention, will be apparent to those skilled in the art upon reference to this description. It is therefore contemplated that the appended claims will cover any such modifications or embodiments as may fall within the scope of the invention defined by the following claims and their equivalents.

What is claimed is:

1. A system for decoding data, comprising:
   a syndrome generator for generating a PI (Parity of Inner-code) direction syndrome and a PO (Parity of Outer-code) direction syndrome from an ECC (Error Correction Code) block comprising main data, a PI, and a PO;
   a memory that stores said PO direction syndrome during generation of said PO direction syndrome;
   a data buffer for storing said main data from said ECC block, said PI direction syndrome and said PO direction syndrome; and
   an ECC decoder for performing error correction decoding of said main data stored in said data buffer, using said PI direction syndrome and said PO direction syndrome.

2. The system as claimed in claim 1 further comprising a data room to store said PI direction syndrome and said PO direction syndrome, wherein said ECC decoder accesses said PI direction syndrome and said PO direction syndrome from said data room for ensuing error correction decoding.

3. The system as claimed in claim 2 wherein said syndrome generator reads said ECC block and transfers said main data to said data buffer; and said ECC decoder reeds said PI direction syndrome and said PO direction syndrome from said data buffer to said data room and repeats ECC decoding by accessing and correcting said PI direction syndrome and said PO direction syndrome in said data room and writing corrected main data into said data buffer.

4. The system as claimed in claim 1 further comprising a demodulator that receives and demodulates data from an optical disk to generate said ECC block and that converts M bit code words into N bit data symbols (M>N).

5. The system as claimed in claim 1 wherein said data buffer receives (i) said main data and said PI direction syndrome from said syndrome generator and (ii) said PO direction syndrome from said memory.

6. The system as claimed in claim 1 further comprising a de-scrambler and EDC (Error Detection Code) check for de-scrambling said main data stored in said data buffer and checking for errors in said main data.

7. The system as claimed in claim 1 further comprising an ATAPI (Advanced Technology Attachment Packet Interface) for reading said main data stored in said data buffer, then de-scrambling and transmitting said main data to a host.

8. A method for decoding data, comprising the steps of:
   (a) demodulating the data to generate an ECC (Error Correction Code) block that comprises main data, a PI (Parity of Inner-code), and a PO (Parity of Outer-code);
   (b) writing said main data into a data buffer;
   (c) calculating a PI direction syndrome from said PI and a PO direction syndrome from said PO, and storing PO direction syndrome data in a memory during calculating said PO direction syndrome;
   (d) writing said PI direction syndrome and said PO direction syndrome into said data buffer;
   (e) reading said PI and PO direction syndromes from said data buffer to an ECC decoder to perform error correction decoding of the PI and PO directions; and
   (f) when errors are found, correcting said PI direction syndrome and said PO direction syndrome, and writing corrected main data into said data buffer.

9. The method as claimed in claim 8 further comprising converting M bit code words into N bit data symbols (M>N).

10. The method as claimed in claim 8 further comprising de-scrambling said main data and checking for errors in said main data.

11. The method as claimed in claim 8 further comprising de-scrambling said main data and transmitting said de-scrambled data to a host.

12. The method as claimed in claim 8 further comprising abandoning said PI and said PO after said step of calculating said PI direction syndrome and said PO direction syndrome.

13. A system for decoding data, comprising:
    a syndrome generator for generating a PI direction syndrome from an ECC (Error Correction Code) block that comprises main data, a PI (Parity of Inner-code), and a PO (Parity of Outer-code);
    a data buffer for storing said main data, said PI direction syndrome and said PO; and
    an ECC decoder for performing error correction decoding of said main data, said PI direction syndrome and said PO.

14. The system as claimed in claim 13 further comprising a memory that connects with said ECC decoder to store a PO direction syndrome calculated by said ECC decoder while performing PO direction error decoding.

15. The system as claimed in claim 14 wherein said syndrome generator transfers said main data, said PO and said PI direction syndrome to said data buffer; and said ECC decoder reads said main data and said PO from said data buffer, calculates said PO direction syndrome and performs error correction decoding of the PO direction, then writes said PO direction syndrome into said memory, corrects said PI direction syndrome and writes corrected main data into said data buffer.

16. The system as claimed in claim 15 wherein said ECC decoder further reads said PI direction syndrome from said data buffer to perform error correction of the PI direction, corrects said PI direction syndrome in said data buffer, corrects said PO direction syndrome in said data room, and writes the corrected main data into said data buffer.

17. The system as claimed in claim 13 further comprising a demodulator that receives and demodulates data from an optical disk to generate said ECC block and that converts M bit code words into N bit data symbols (M>N).

18. The system as claimed in claim 13 further comprising a de-scrambler and EDC (Error Detection Code) check for de-scrambling said main data stored in said data buffer and checking for errors in said main data.

19. The system as claimed in claim 13 further comprising an ATAPI (Advanced Technology Attachment Packet Interface) for reading said main data stored in said data buffer de-scrambling and transmitting said main data to the host.

20. The system as claimed in claim 13 wherein said ECC decoder reads said PI syndrome from said data buffer, performs error correction decoding of the PI direction, and when one or more errors are found, corrects said main data and said PO in said data buffer.

21. A method for decoding data, comprising the steps of:
(a) demodulating the data to generate an ECC (Error Correction Code) block that comprises main data, a PI (Parity of Inner-code), and a PO (Parity of Outer-code);
(b) calculating a PI direction syndrome;
(c) writing said PI direction syndrome, said main data and said PO into a data buffer;
(d) reading said main data and said PO from said data buffer to an ECC decoder to calculate a PO direction syndrome and perform error correction decoding of the PO direction;
(e) when errors are found, correcting said PO direction syndrome and said PI direction syndrome, and writing corrected main data into said data buffer;
(f) reading said PI direction syndrome from said data buffer to said ECC decoder to perform error correction decoding of the PI direction; and
(g) when errors are found, correcting said PO direction syndrome and said PI direction syndrome, and writing corrected main data into said data buffer.

22. The method as claimed in claim 21 further comprising converting M bit code words into N bit data symbols (M>N).

23. The method as claimed in claim 21 further comprising de-scrambling said main data and checking for errors in said main data.

24. The method as claimed in claim 21 further comprising de-scrambling said main data and transmitting said de-scrambled data to a host.

25. The method as claimed in claim 21 further comprising abandoning said PI after said step of calculating said PI direction syndrome.

26. A decoding system for receiving and decoding data from an optical disk, comprising:
a demodulator for receiving and demodulating data from the disk to generate an ECC (Error Correction Code) block that comprises main data, a PI (Parity of Inner-code), and a PO (Parity of Outer-code);
a syndrome generator for generating a PI syndrome;
a data buffer for storing said main data, said PI syndrome and said PO;
a first de-scrambler and EDC (Error Detection Code) check for de-scrambling said main data stored in said data buffer and checking for errors in said main data;
an ECC decoder for performing error correction decoding of said ECC block;
a memory that connects with said ECC decoder to store a PO syndrome;
a second de-scrambler and EDC check for de-scrambling said main data and checking whether errors in said main data are corrected; and
an ATAPI (Advanced Technology Attachment Packet Interface) for reading said main data stored in said data buffer, then de-scrambling and transmitting said main data to a host.

27. The decoding system as claimed in claim 26 wherein said syndrome generator reads said ECC block from said demodulator, then generates said PI syndrome and transfers said main data, said PO and said PI syndrome to said data buffer, meanwhile said main data is also transferred to said first de-scrambler and EDC check.

28. The decoding system as claimed in claim 26 wherein said ECC decoder reads said PI syndrome from said data buffer to perform the error correction decoding of the PI direction, transfers a detected error to said second de-scrambler and EDC check to get the EDC check of the PI direction, corrects said PI syndrome and said PO in said data buffer, and writes corrected main data into said data buffer, afterward said ECC decoder reads said main data and said PO from said data buffer to generate said PO syndrome, writes said PO syndrome into said memory to perform error correction decoding of the PO direction, corrects said PO syndrome in said memory and said PI syndrome in said data buffer, and rewrites any further corrected main data into said data buffer.

29. The decoding system as claimed in claim 26 wherein said demodulator converts M bit code words into N bit data symbols (M>N).

30. A decoding method for receiving and decoding data from an optical disk, comprising the steps of:
(a) transmitting the data from the disk to a demodulator, wherein said demodulator demodulates the data to generate an ECC (Error Correction Code) block that comprises main data, a PI (Parity of Inner-code), and a PO (Parity of Outer-code);
(b) transmitting said ECC block to a syndrome generator to calculate a PI syndrome;
(c) writing said PI syndrome, said main data and said PO into a data buffer, and transmitting said main data to a first de-scrambler and EDC check to de-scramble said main data and check whether errors in said main data are corrected;
(d) reading said PI syndrome from said data buffer to an ECC decoder to perform error correction decoding of the PI direction, and transmitting any detected error to a second de-scrambler and EDC check to get the EDC check of the PI direction;

(e) correcting said PI syndrome and said PO in said data buffer and writing PI corrected main data into said data buffer;
(f) reading said main data and said PO from said data buffer to said ECC decoder to calculate a PO syndrome;
(g) writing said PO syndrome into a memory to perform error correction decoding of the PO direction;
(h) correcting said PO syndrome in said memory and correcting said PI syndrome in said data buffer, and writing PO corrected main, data into said data buffer;
(i) reading said main data from said data buffer to a second de-scrambler and EDC check to de-scramble said main data and to check again whether errors in said main data are corrected; and
(j) reading said main data from said data buffer to an ATAPI to de-scramble said main data and transmit to the host.

31. The decoding method as claimed in claim 30 wherein said ECC block is generated by converting M bit code words into N bit data symbols (M>N).

32. The decoding method as claimed in claim 30 wherein said ECC decoder comprises a RSPC (Reed Solomon Product Code) structure.

33. The decoding method as claimed in claim 30 wherein said data buffer and said memory are independently selected from the group consisting of EDO-RAM, SRAM, DRAM, SL-DRAM, DR-DRAM, EDO-DRAM, SDRAM, DDR-SDRAM, and VC-SDRAM.

* * * * *